(12) United States Patent
Pennequin et al.

(10) Patent No.: US 7,175,167 B2
(45) Date of Patent: Feb. 13, 2007

(54) ELASTOMERIC SUSPENSION SPRING FOR A MOTOR VEHICLE AND A SUSPENSION JOINT INCORPORATING THE SPRING

(75) Inventors: Patrick Pennequin, Ennezat (FR); Yolanda Yague, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 241 days.

(21) Appl. No.: 10/717,390

(22) Filed: Nov. 20, 2003

(65) Prior Publication Data

US 2004/0102567 A1 May 27, 2004

(51) Int. Cl.
*B60G 13/00* (2006.01)

(52) U.S. Cl. .................. 267/195; 267/140; 280/788; 524/399; 524/495; 524/496

(58) Field of Classification Search ............... 267/195, 267/140; 280/788; 524/399, 495, 496
See application file for complete search history.

(56) References Cited

U.S. PATENT DOCUMENTS

| | | | |
|---|---|---|---|
| 3,994,842 A | 11/1976 | Kimura et al. | 260/3 |
| 5,002,829 A | 3/1991 | Shibahara | 428/409 |
| 6,074,016 A | 6/2000 | Blondelet et al. | 301/127 |
| 6,435,491 B1 * | 8/2002 | Blondelet et al. | 267/279 |

FOREIGN PATENT DOCUMENTS

| | | |
|---|---|---|
| DE | 43 40 902 | 6/1994 |
| EP | 0 461 464 | 12/1991 |
| WO | WO 97/47486 | 12/1997 |
| WO | WO 99/41302 | 8/1999 |

OTHER PUBLICATIONS

International Search Report, PCT/EP 02/05546, Sep. 25, 2002.

* cited by examiner

*Primary Examiner*—Peter D. Mulcahy
(74) *Attorney, Agent, or Firm*—Buchanan Ingersoll & Rooney PC

(57) ABSTRACT

An elastomeric suspension spring (14) usable for bearing the load of a motor vehicle, which exhibits both reduced creep and improved endurance in torsion and a suspension joint comprising this spring consists of a cross-linked rubber composition based on (phr: parts by weight per hundred parts of diene elastomer(s)):
natural rubber in a quantity equal to or greater than 60 phr,
a filler, and
a sulfur cross-linking system comprising at least one cross-linking accelerator, and is such that said filler comprises, in a mass fraction greater than 55%:
a carbon black, whose grade varies from 600 to 900, said composition comprising in this case a total quantity of filler of from 10 to 60 phr, or
an inert white filler, said composition comprising in this case a total quantity of filler of from 10 to 30 phr,
the cross-linking system comprising 0.7 to 1.2 phr of sulfur and being such that the mass ratio of sulfur to cross-linking accelerator(s) varies from 0.15 to 2.70.

10 Claims, 3 Drawing Sheets

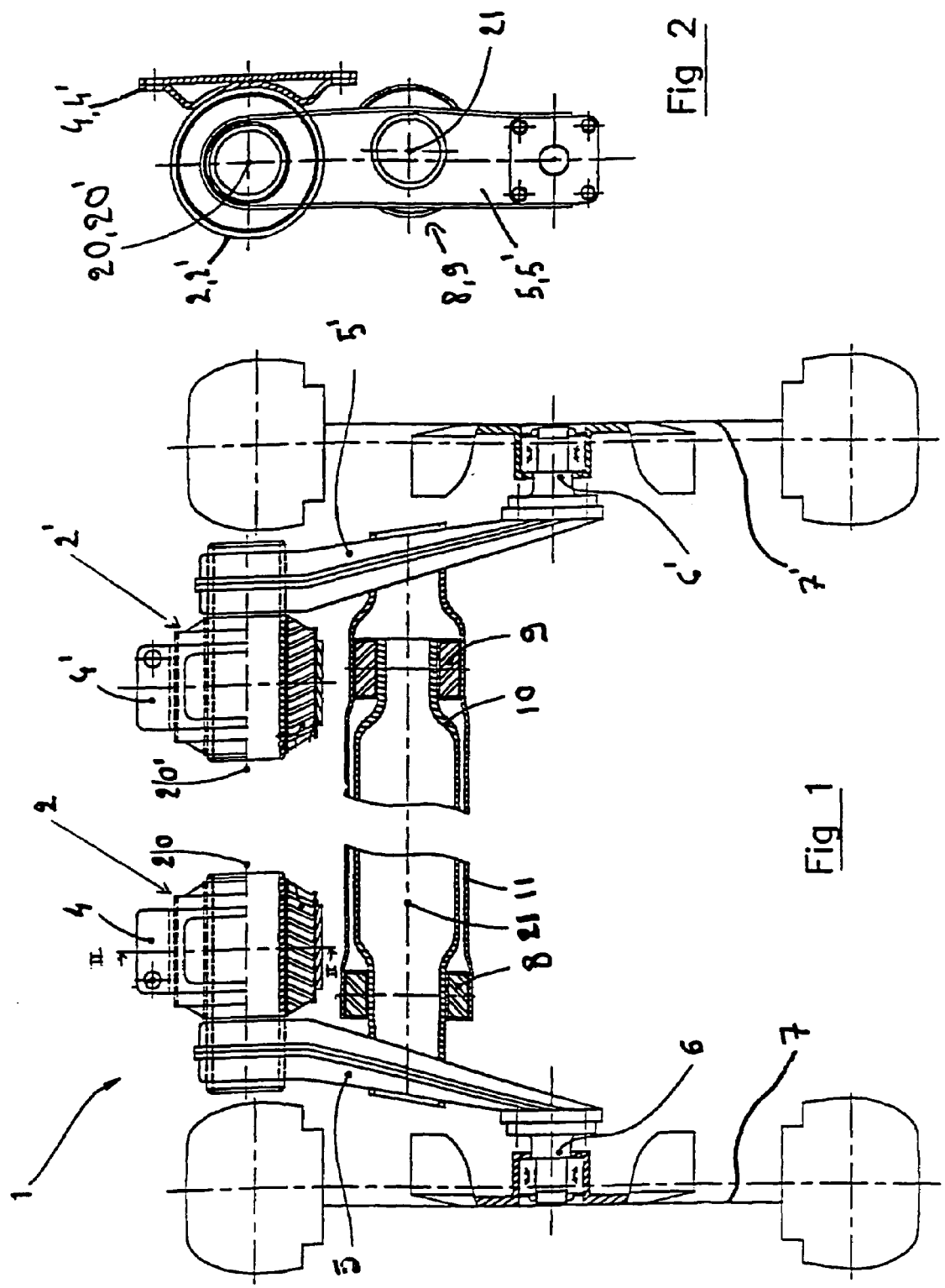

ELASTOMERIC SUSPENSION SPRING FOR A MOTOR VEHICLE AND A SUSPENSION JOINT INCORPORATING THE SPRING

BACKGROUND AND SUMMARY OF THE INVENTION

The present invention relates to an elastomeric suspension spring, usable for bearing the load of a motor vehicle, which spring exhibits both reduced creep and improved endurance in torsion. The invention also relates to a suspension joint comprising this spring and a process for reducing the creep of this spring when it is incorporated into said joint on a vehicle.

Motor vehicle suspension joints generally use blocks which each comprise an elastomeric spring for, as compared to rolling or plain bearings which were used in the past, improved integration of load-bearing functions and shock or vibration absorption and filtering. A suspension device comprising elastomeric suspension springs has the advantage of comprising a reduced total number of components, in particular due to the fact that it does not comprise a separate filtering block for linking an axle or a suspension arm to the vehicle body.

Use of elastomeric springs also provides the corresponding suspension device with the required degrees of freedom, while ensuring satisfactory filtering, in particular from an acoustic point of view. Moreover, it is possible to impart to these elastomeric springs quite sophisticated guiding functions by controlling their deformation under in service stresses, to achieve for example self-steering axles, i.e. axles which turn the plane of the wheels slightly solely by transferring forces, or to incorporate a horizontal degree of freedom.

International Patent Application WO-A-97/47486 discloses a suspension device, the axle of which is provided with elastomeric suspension and anti-roll springs, which are stressed torsionally. Suspension springs, which are intended to bear the load of the vehicle, control wheel clearance relative to a bearing point formed by the vehicle body. Anti-roll springs in turn control wheel clearance (or the clearance of the arm bearing the wheel) relative to a bearing point consisting of the opposing wheel (or the opposing arm, respectively).

U.S. Pat. No. 4,383,074 discloses a natural rubber-based elastomeric spring composition which is designed to impart to a spring satisfactory dynamic functioning endurance.

This composition comprises, in a quantity of less than or equal to 40 phr (phr: parts by weight per hundred parts of elastomer), a reinforcing filler which consists of a blend of two carbon blacks, one being a very fine 200-grade black (reinforcing grade "ISAF" black) and the other being a "coarse" 700-grade black (non-reinforcing grade "SRF" black). In the examples given in this document, the reinforcing filler comprises said 200-grade black in a mass fraction greater than 45% and said 700-grade black in a mass fraction of less than 55%. This filler thus comprises a relatively high proportion of reinforcing grade carbon black, to obtain the above-mentioned endurance.

This composition is furthermore obtained by means of a sulfur cross-linking system, with a quantity of sulfur equal to 2.75 phr and a mass ratio of sulfur to cross-linking accelerator equal to 2.75.

U.S. Pat. No. 5,904,220 discloses, in its example embodiments, a natural rubber-based elastomeric spring composition which also comprises a reinforcing filler consisting of reinforcing grade carbon black. This reinforcing filler is present in said composition in a quantity of 55 phr.

This composition is likewise obtained by means of a sulfur cross-linking system, with a quantity of sulfur equal to 0.5 phr and a ratio of sulfur to cross-linking accelerators of approximately 0.14.

None of these patent specifications relates to the technical problem of creep in elastomeric spring compositions, which is a major disadvantage for currently known suspension joints and which manifests itself after they are fitted to the vehicle axles, in particular after a few days of dynamic operation of these joints in torsion (said creep then being known as dynamic creep). This creep results in changes to the height of the vehicle body over time.

The Applicant has surprisingly discovered a cross-linked rubber composition that may be used to produce an elastomeric suspension spring which, when it is installed between two coaxial armatures to bear the load of a motor vehicle, advantageously exhibits minimized dynamic creep and satisfactory torsional endurance, the cross-linked rubber composition being based on natural rubber in a quantity equal to or greater than 60 phr (phr: parts by weight per hundred parts of diene elastomer(s)) and based on a sulfur cross-linking system comprising 0.7 to 1.2 phr of sulfur and comprising at least one cross-linking accelerator such that the mass ratio of sulfur/cross-linking accelerator(s) varies from 0.15 to 2.70, and based on a filler comprising, in a mass fraction greater than 55%:

a carbon black, whose grade varies from 600 to 900, said composition comprising in this case a total quantity of filler of from 10 to 60 phr, or an inert white filler, said composition comprising in this case a total quantity of filler of from 10 to 30 phr.

Of course, the expression "composition based on" is to be understood to mean a composition comprising the mix and/or the product of reaction in situ of the different constituents used, some of these compounds being able to and/or being intended to react together, at least in part, during the different phases of manufacture of the composition.

The natural rubber may be used in a blend with one or more other "essentially unsaturated" diene elastomers in the rubber composition according to the invention, which may be present in a quantity less than or equal to 40 phr.

Diene elastomer is understood to mean, in known manner, an elastomer (a homopolymer or a copolymer) resulting at least in part from diene monomers (monomers bearing two double carbon-carbon bonds, whether conjugated or not).

In general, "essentially unsaturated" diene elastomer is understood here to mean a diene elastomer resulting at least in part from conjugated diene monomers, this elastomer having a content of members or units of diene origin (conjugated dienes) which is greater than 15% (mol %).

These definitions being given, the following are understood in particular to be meant by diene elastomer(s) capable of being used in a blend with natural rubber in the compositions according to the invention:

any homopolymer obtained by polymerization of a conjugated diene monomer having 4 to 12 carbon atoms;

any copolymer obtained by copolymerization of one or more dienes conjugated together or with one or more vinyl aromatic compounds having 8 to 20 carbon atoms;

The diene elastomer of the composition according to the invention is selected for example from the group of diene elastomers consisting of polybutadienes (BR), polyisoprenes (IR) or butadiene-styrene copolymers (SBR).

Preferably the composition according to the invention comprises a blend:

of natural rubber in a quantity of from 70 phr to 100 phr, and of synthetic polyisoprene in a quantity of from 30 phr to 0 phr.

Even more preferably, the composition according to the invention comprises solely natural rubber (that is to say in a quantity of 100 phr).

As far as the filler comprising the composition according to the invention is concerned, said filler preferably comprises, in a mass fraction greater than 70%, said carbon black whose grade varies from 600 to 900 or said inert white filler.

It is possible to use as the filler of the composition according to the invention a blend of said carbon black whose grade varies from 600 to 900 and said inert white filler.

It is also possible to use as filler of said composition either said carbon black whose grade varies from 600 to 900 or said inert white filler (the above-mentioned mass fraction being in this case equal to 100%).

According to a preferred example of embodiment of the invention, said filler comprises, in the above-mentioned mass fraction (greater than 55% or preferably than 70%), said 600- to 900-grade carbon black (that is to say a "coarse" black of a grade known as being non-reinforcing). As carbon blacks of this type which may be used in the composition according to the invention, mention may be made, for example, of 700-grade carbon blacks, such as those known as "N772" or "N765".

Preferably, the filler of said composition comprises said 600- to 900-grade carbon black in a quantity of from 40 to 60 phr. It will be noted that such a quantity of carbon black is particularly well adapted to imparting satisfactory thermoelasticity to the corresponding joint, i.e. which is representative of a variation in attitude minimized as a function of the temperature gradients to which it is subjected.

According to one variant embodiment of the invention, the filler of the composition according to the invention comprises, in the above-mentioned mass fraction (greater than 55% or more preferably greater than 70%), an inert white filler. As inert white filler (that is to say an inorganic filler which has little or no reinforcing action, sometimes also known as inert clear filler), which is usable as all or part of said filler, a silica with little reinforcing action is used, for example, whose BET and CTAB specific surface area values are close to 60 m$^2$/g, such as silica sold under the name "ULTRASIL 360". It is also possible to use, as non-reinforcing white filler, clays, such as kaolin or bentonite, or chalks, or alternatively titanium oxides.

The filler of said composition may comprise said inert white filler in a quantity of from 10 to 30 phr. It will be noted that such a quantity of inert white filler is particularly well adapted to imparting satisfactory cold stiffening to the composition according to the invention (cold stiffening is known to mean an increase in static stiffness in the event of diminishing temperature).

Of course, the filler of the composition according to the invention may comprise a plurality of carbon blacks ranging in grade from 600 to 900 and/or a plurality of inert white fillers.

According to a preferred example of embodiment of the invention, the sulfur cross-linking system used is a system in which the mass ratio of sulfur to cross-linking accelerator(s) varies from 0.15 to 0.50.

It will be noted that this preferred range for the value of the sulfur/accelerator ratio allows minimization of the secondary creep of the composition according to the invention (secondary creep is understood to mean creep of a chemical nature resulting from changes to the cross-linking network).

Advantageously, the cross-linking activator used is zinc 2-ethylhexanoate. It will be noted that this specific activator also allows minimization of the dynamic creep of the elastomeric spring made of the composition according to the invention.

The elastomeric spring according to the invention is for example obtained:

by mixing by thermomechanical working of the various constituents of the rubber composition according to the invention, which is performed in one or more stages in an internal mixer, followed by cross-linking of the cross-linkable composition thus obtained in an injection mould using techniques known to the person skilled in the art.

According to another feature of the invention, said cross-linked composition has a dynamic shear modulus G* at 100% deformation, measured to standard ASTM D 5992-96 at a temperature of 23° C. and at a frequency of 10 Hz to standard ASTM D 1349-99, which is within a range from 0.5 MPa to 5.5 MPa.

The present invention also provides a suspension joint for a motor vehicle, said joint being intended to bear the load of said vehicle and consisting of two substantially cylindrical and concentric armatures which are connected together by an elastomeric suspension spring.

According to the invention, this joint is such that said suspension spring is such as defined above.

The present invention also provides a process for reducing the creep of an elastomeric suspension spring usable for bearing the load of a motor vehicle, when said spring is fitted between two coaxial armatures with a view to bearing the load of a motor vehicle, said spring consisting of a cross-linked rubber composition.

According to the invention, this process consisting substantially in mixing by thermomechanical working:

one or more diene elastomers, which comprise natural rubber in a quantity equal to or greater than 60 phr;

a filler which comprises, in a mass fraction greater than 55%;

a carbon black, whose grade varies from 600 to 900, said filler being in this case present in the composition in a quantity of from 10 to 60 phr; or an inert white filler, said filler being in this case present in said composition in a quantity of from 10 to 30 phr, and a sulfur cross-linking system comprising at least one cross-linking accelerator, said cross-linking system comprising from 0.7 to 1.2 phr of sulfur and being such that the mass ratio of sulfur to cross-linking accelerator(s) varies from 0.15 to 2.70.

The aforementioned features of the present invention, as well as others, will be better understood on reading the following description of several examples of embodiment of the invention, which are given by way of illustration and not of limitation, said description being made in conjunction with the attached drawings, in which:

BRIEF DESCRIPTION OF THE DRAWINGS

FIG. 1 is a sectional view of a rear suspension device for a vehicle comprising elastomeric spring joints fulfilling in particular the function of suspension spring and anti-roll spring, FIG. 2 is a sectional view, in the plane II—II of FIG. 1, of said suspension device.

DETAILED DESCRIPTION OF THE INVENTION

Figure 3:
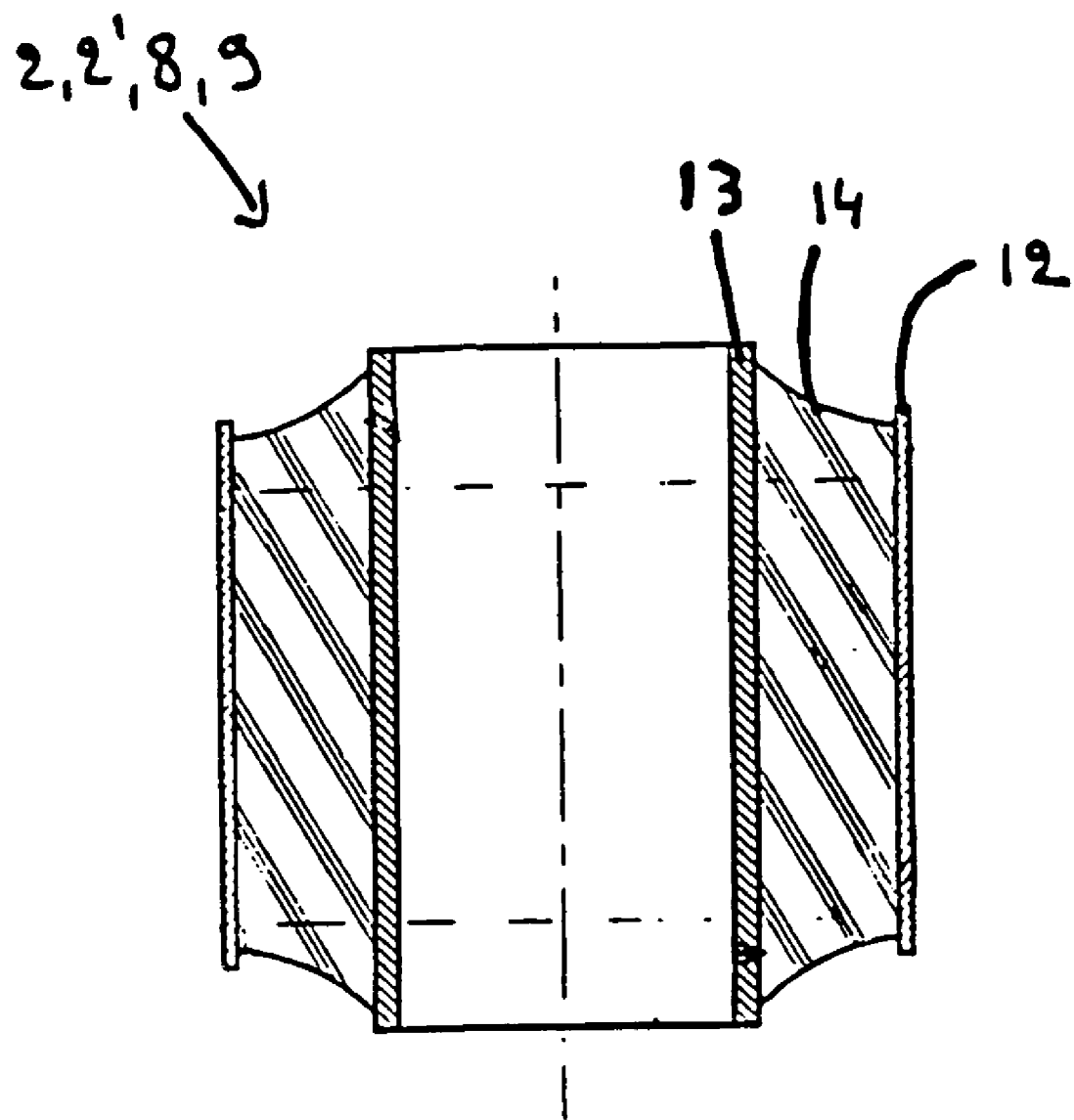
FIG. 3 is a sectional view in the plane of FIG. 1 of an example of a suspension joint with elastomeric spring.

FIGS. 1 and 2 show a rear suspension device 1 of a motor vehicle, which is more fully described in International Patent Application WO-A-97/47486. The joints 2, 2', which fulfill the function of load-bearing spring, are fixed to the body of the vehicle through the intermediary of supports 4, 4'. The joints 2, 2' hold the suspension arms 5, 5', which in turn carry the stub axles 6, 6', on which are mounted the wheels 7, 7'. The joints 8, 9 which have the anti-roll function hold the profiles 10, 11 rigidly connected to the arms 5, 5' in a substantially concentric mutual position, and elastically resist relative rotation thereof.

FIG. 3 shows schematically a joint usable in the device of FIGS. 1 and 2. This joint 2, 2', 8, 9 consists of two substantially cylindrical, concentric armatures 12, 13, which are connected together by an elastomeric spring 14, deformable and stressed torsionally about its axis 20, 20', 21.

The mechanical properties of each elastomeric spring 14 according to the invention were measured in the following manner.

I/ Static Creep

Figure 4:
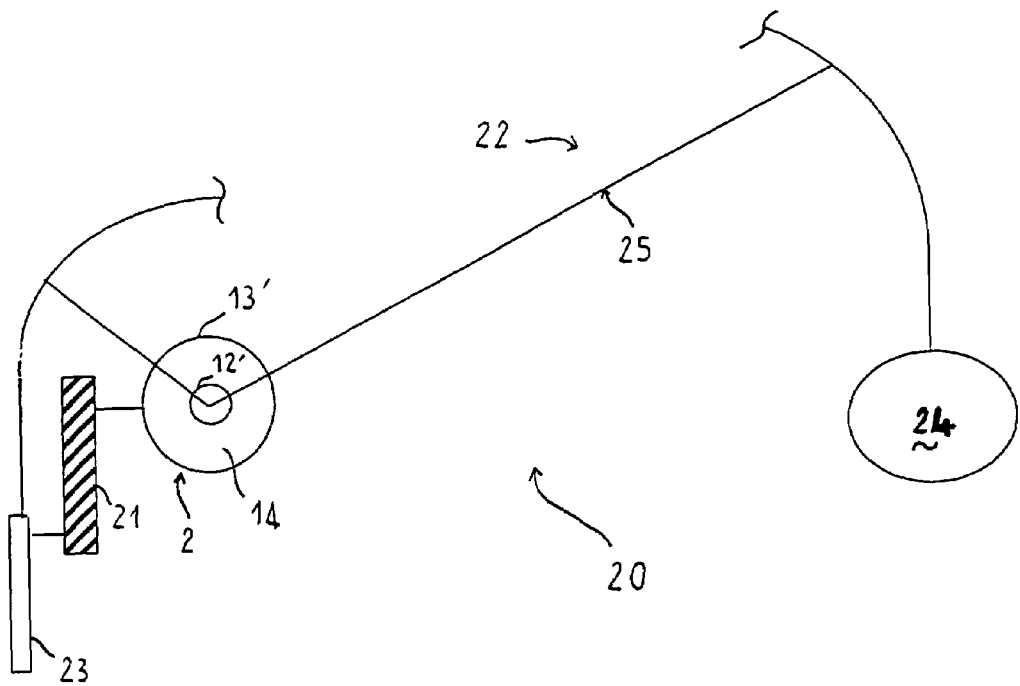
FIG. 4 is a schematic view of a device for measuring the static creep and static thermoelasticity of an elastomeric spring according to the invention inside the corresponding joint.

With reference to FIG. 4, the static creep of each elastomeric spring 14 according to the invention was measured between a pin 12' and a ring 13', onto which the spring 14 is shrink-fitted, the pin 12' and the ring 13' being respectively provided to form internal and external armatures of a suspension joint 2.

To this end, torsional tests were performed by means of the device 20 of FIG. 4 on each suspension joint 2 thus obtained, in such a way that the corresponding spring 14 can only move in axial torsion, that is to say according to a single degree of freedom. To this end, the pin 12' is mobile in torsion and the ring 13' is connected to a frame 21 of the device 20 in such a way as to be blocked rotationally.

This device 20 essentially comprises a means 22 of displacing in torsion the pin 12', which is intended to simulate the stresses applied to the elastomeric spring 14 on a vehicle in service, and a sensor 23 intended to detect the variation in gradient (comparable to an "attitude") of the joint 2 resulting from the static creep of the spring 14, in response to the torsion of said pin 12'. The initial mounting gradient of the joint 2 (starting attitude) is fixed by calibration.

The means of displacement 22 comprises a load 24 which is mounted at the end of an arm 25 1 m long and the weight of which exhibits a given nominal value (representing the load to which a joint 2 is subjected on a vehicle containing two people and a full tank of fuel, this load being equivalent to 185 daN according to one example of embodiment). The change in the attitude of the joint 2 is measured at 250 mm from said pin 12' as a function of time.

These attitude measurements were performed over 24 hours, and at a constant temperature of 20° C.

Each test performed consisted in measuring, on the basis of the characteristic curve of the attitude (in mm) as a function of the time t (in hours), a creep slope (in % per decade) for each joint 2 tested, in two different configurations.

A first configuration is characterized by progressive loading of the joint 2 (over a period of 30 seconds approximately), to obtain said nominal stress value applied to the joint 2 by the load 24 (hereinafter "nominal" test configuration), said value being maintained for the above-mentioned 24 hours.

A second configuration is characterized by initial loading of the joint 2, effected prior to the above-mentioned nominal stress loading. This initial loading is performed by applying a predetermined stress corresponding substantially to the maximum deformation which the spring 14 may receive in service, that is to say at the limit of maximum compression on a vehicle (hereinafter "pre-deformed" test configuration), then by relaxing said predetermined stress in order to perform said nominal stress loading for the above-mentioned 24 hours.

Reference may be made to U.S. Pat. No. 6,435,491 to Blondelet et al., which is owned in common with the present application, the content of which is incorporated herein by reference, for a detailed description relating to said predetermined stress corresponding to the maximum deformation of the spring 14 in service.

The above-mentioned creep slope was calculated on the basis of a graph representing the changes in the attitude (y coordinate in mm) on a semi-logarithmic scale, that is to say as a function of the x coordinate=$\log_{10}(1+t)$, by means of the equation:

$$\text{Slope}=(100\times A)/(B-C)$$

A and B respectively representing the direction coefficient and the y coordinate at the origin of the equation line Y=A X+B, which basically characterizes this graph, and C representing the above-mentioned initial value of the attitude (mm).

II/ Static and Dynamic Creep

Figure 5:
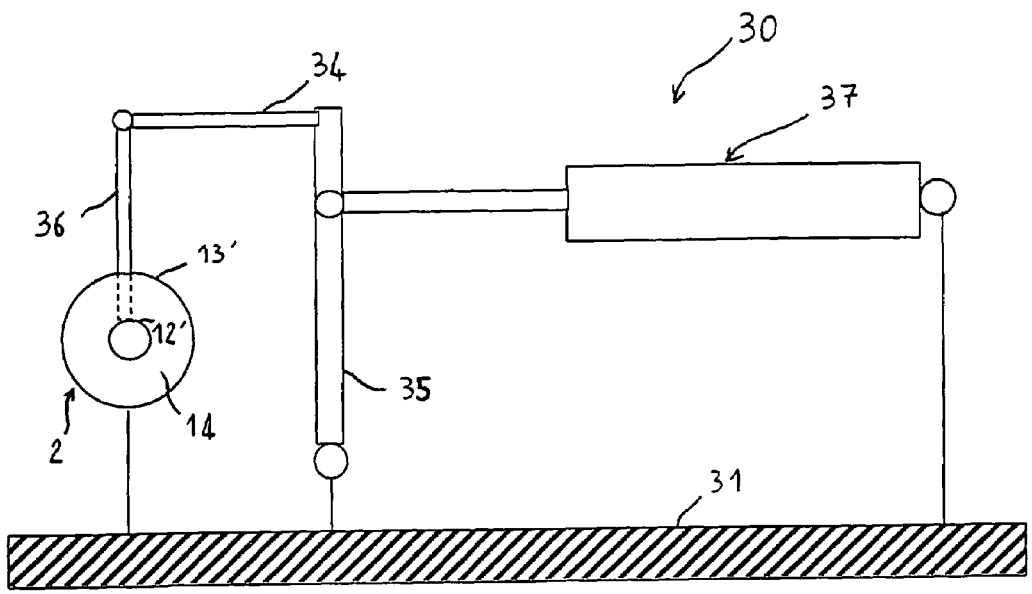
FIG. 5 is a schematic view of a device for measuring the dynamic creep and endurance of a spring according to the invention inside the corresponding joint.

With reference to FIG. 5, the dynamic creep of each elastomeric spring 14 according to the invention was measured between a pin 12' and a ring 13', onto which it is shrink-fitted, following the example of the joint 2 of above-stated paragraph I/.

To this end, torsional tests were performed by means of the device 30 of FIG. 5 on each suspension joint 2 thus obtained, in such a way that the corresponding spring 14 can move in torsion. To this end, the pin 12' is mobile in torsion and the ring 13' is connected to the frame 31 of the device 30 in such a way as to be blocked rotationally.

This device 30 essentially comprises a means 32 of displacing in torsion the pin 12', which is intended to simulate the dynamic stresses applied to the elastomeric spring 14 on a vehicle in service, and a sensor (not shown) intended to detect the variation in gradient or "attitude" of the joint 2, in response to the torsion of said pin 12'. The initial mounting gradient of the joint 2 (starting attitude) is fixed by calibration.

The displacement means 32 comprises a connecting rod 34 which is connected, at one of its ends, to a mobile gantry 35 mounted on the frame 31 and, at its other end, to an arm 36 which is itself connected to the pin 12' of the joint 2. This displacement means 32 is controlled by a linear stroke piston-cylinder unit 37 which is connected to the frame 31.

For each of the measurements performed by means of this device 30, initial loading of the joint 2 is effected until a "shock" position of maximum deformation in compression is reached (by analogy with the "predeformed" configuration of paragraph I/), relaxation of said stress then being effected until application of a nominal load of 185 daN, which is exerted for a period of 3 hours.

For these 3 hours the changes in attitude of the joint 2 under this nominal load are noted.

Then, for 13 hours, each joint 2 is subjected to dynamic stress cycles which each last for 30 minutes, in such a way as to correspond to a real signal measured on the road, and which end by application of said nominal load for 10 minutes for creep. Each joint 2 is finally subjected to the nominal load for a period of 4 hours, following the above-mentioned dynamic cycles.

Each test performed consisted in measuring, on the basis of the characteristic curve of the attitude (in mm) as a function of the time t (in seconds), a creep slope (in % per decade) for each joint 2 tested.

As described in the above paragraph I/ with regard to calculating the static creep slope, the static and dynamic creep slopes are obtained on the basis of a graph representing the changes in attitude (mm) on a semi-logarithmic scale, the dynamic creep slope have been measured during the stoppage times of said dynamic stresses.

III/Torsional Endurance

Still with reference to FIG. 5, the endurance (that is to say the service life) of each elastomeric spring 14 according to the invention was measured between a pin 12' and a ring 13', onto which it is shrink-fitted, following the example of the joints 2 of above-stated paragraphs I/ and II/.

To this end, torsional tests were performed simultaneously by means of the device 30 of FIG. 5 on three juxtaposed suspension joints 2, as detailed in paragraph II/, so as to be able to follow the changes in the force and deformation parameters.

For each of the measurements performed, initial loading of each joint 2 is effected until a "shock" position of maximum deformation is reached, relaxation of said stress then being effected until a "nominal" attitude is obtained (the latter corresponding to the geometric position of an axle for a traveling load of 185 daN comprising two people in the vehicle and a full tank of fuel), which attitude is maintained for a period of 10 seconds, when the force on each joint 2 is measured.

The three low deflection cycles which are performed obtain a characteristic stiffness curve (force/deflection) for each joint 2.

One thousand "shock/rebound" cycles are applied to the joints 2 ("shock" is understood to mean the maximum deflection travel in compression and "rebound" is understood to means the maximum spring-back travel possible for the axle incorporating these joints 2), the last cycle being intended to provide a stiffness measurement under severe deflection.

The joints 2 are then subjected to a time delay of 10 seconds, until they break.

The measurements are stopped as a function of the minimum force values to be reached in the "shock" position.

A characteristic curve is obtained (on a semi-logarithmic scale) for the loss of force (daN) as a function of the number of "shock/rebound" cycles and, by performing linear interpolation of the initial part of this characteristic curve, the joints 2 are considered to have reached the end of their lives when the difference between the actual curve and the interpolation line is greater than 5%.

IV/ Static Thermoelasticity

With reference to FIG. 4, it was sought to simulate the variation in vehicle attitude brought about by a temperature gradient by testing between 40° C. and −20° C. and under a constant static load elastomeric springs 14 according to the invention within joints 2 such as those described in the preceding paragraphs.

To this end, torsional tests were performed by means of said device 20 in FIG. 4, which is additionally provided with a thermal enclosure for the establishment of a temperature for a given time period, on each suspension joint 2 thus obtained (see paragraph I/ for a description of said device 20).

For each of the measurements performed with reference to a set temperature value, initial loading of each joint 2 is performed, until a position of maximum deformation is reached, relaxation of this stress then being performed until an attitude is obtained which corresponds to the nominal load of 185 daN, which attitude is maintained for a period of 17 hours, when the force on each joint 2 is measured.

On the basis of a characteristic curve for the attitude (in mm) as a function of the established temperature, an attitude variation slope is obtained between 40° C. and −20° C. (calculated in % per decade of ° C. by linearization of this characteristic curve).

V/ Stiffnesses

A "static" stiffness Ks is determined at a relatively high level of deformation ranging from 10 to 200% under shear and at a low frequency, by measuring dynamic stiffness under shear at 15 Hz with a peak-to-peak deformation of approximately 100%.

A "dynamic" stiffness Kd is determined at a low level of deformation of from 0.1 to 2% under shear and at a frequency of 150 Hz. The joint 2 will absorb the acoustic vibrations better with lower stiffness value Ks and a lower value of the ratio Kd/Ks).

VI/ Dynamic Properties

The shear moduli G* of the elastomeric springs 14 according to the invention are measured on a "SCHENCk" machine in accordance with ASTM Standard D 5992-96, at a temperature of 23° C. and a frequency of 10 Hz to the ASTM standard D 1349-99.

Scanning is performed at an amplitude of deformation of 0.1 to 100% ("outward" cycle), then of 100 to 0.1% ("return" cycle).

EXAMPLES

Five elastomeric "control" springs RT1 to RT5 and three elastomeric springs according to the invention RI1, RI2 and RI3 were prepared respectively by means of "control" rubber compositions T1 to T5 and rubber compositions according to the invention I1, I2 and I3. The formulations of these compositions are the following (phr: parts by weight per hundred parts of elastomer(s)):

Composition T1:

| | |
|---|---|
| Natural rubber | 100 |
| Carbon black N765 | 11 |
| Antioxidant | 2 |
| Anti-ozone wax | 2 |
| ZnO | 6.5 |
| Stearic acid | 2 |
| Sulfur | 2.5 |
| Vulcanization accelerators (type 1) | 1.5 |

Composition T2:

| | |
|---|---|
| Natural rubber | 100 |
| Carbon black N765 | 45 |
| Antioxidant | 2 |
| Anti-ozone wax | 2 |
| ZnO | 6.5 |
| Stearic acid | 2 |
| Sulfur | 2.5 |
| Vulcanization accelerators (type 1) | 1.5 |

Composition T3:

| | |
|---|---|
| Natural rubber | 70 |
| Polybutadiene | 30 |
| Silica "Ultrasil 360" | 25 |
| Coupling agent "Si69" | 2.5 |
| Antioxidant | 2 |
| Anti-ozone wax | 2 |
| ZnO | 6.5 |
| Stearic acid | 2 |
| Sulfur | 2.5 |
| Vulcanisation accelerators (type 1) | 2.2 |

Composition T4:

| | |
|---|---|
| Natural rubber | 100 |
| Carbon black N330 | 10 |
| Antioxidant | 2 |
| Anti-ozone wax | 2 |
| ZnO | 6.5 |
| Stearic acid | 2 |
| Sulfur | 1.1 |
| Vulcanization accelerators (type 1) | 3.9 |

Composition T5:

| | |
|---|---|
| Natural rubber | 70 |
| Polybutadiene | 30 |
| Silica "Ultrasil 360" | 48 |
| Coupling agent "Si69" | 4 |
| Antioxidant | 2 |
| Anti-ozone wax | 2 |
| ZnO | 6.5 |
| Stearic acid | 2 |
| Sulfur | 0.8 |
| Vulcanisation accelerators (type 1) | 2.8 |

Composition I1:

| | |
|---|---|
| Natural rubber | 100 |
| Carbon black N772 | 19 |
| Antioxidant | 3 |
| Anti-ozone wax | 2 |
| ZnO | 10 |
| Zinc 2-ethylhexanoate | 2 |
| Sulfur | 0.80 |
| Vulcanization accelerators (type 2) | 2.80 |

Composition I2:

| | |
|---|---|
| Natural rubber | 70 |
| Synthetic polyisoprene | 30 |
| Carbon black N765 | 45 |
| Antioxidant | 3 |
| Anti-ozone wax | 2 |
| ZnO | 6.50 |
| Zinc 2-ethylhexanoate | 2 |
| Sulfur | 1.10 |
| Vulcanisation accelerators (type 2) | 3.90 |

Composition I3:

| | |
|---|---|
| Natural rubber | 70 |
| Polybutadiene | 30 |
| Silica "Ultrasil 360" | 25 |
| Antioxidant | 3 |
| Anti-ozone wax | 2 |
| ZnO | 6.5 |
| Zinc 2-ethylhexanoate | 2 |
| Sulfur | 0.8 |
| Vulcanization accelerators (type 1) | 2.8 |

Where:

antioxidant: N-(1,3-dimethylbutyl)-N'-phenyl-p-phenylene-diamine (6PPD);

accelerators type 1: n-oxy-diethylene-benzothiazyl-2-sulfonamide (NOBS) and zinc dibutylphosphorodithioate "ZBPD";

accelerators type 2: n-oxy-diethylene-benzothiazyl-2-sulfonamide (NOBS) and tetrabenzylthiuram disulfide (TBZTD).

In addition, the dynamic moduli G* at 100% deformation of these compositions are as follows:

| Compositions | T1 | T2 | T3 | T4 | T5 | I1 | I2 | I3 |
|---|---|---|---|---|---|---|---|---|
| G* Moduli (MPa) | 0.65 | 1.35 | 0.89 | 0.65 | 1.50 | 0.65 | 1.40 | 0.80 |

Each joint comprising the elastomeric spring RT1 to RT5 and RI1, RI2 and RI3 was obtained by mixing by thermo-mechanical working of the various constituents of the corresponding composition in an internal mixer, followed by cross-linking of this composition between the above-mentioned two cylindrical armatures 12 and 13 (see FIG. 3) in an injection mould.

The radial dimensions of each joint incorporating the corresponding spring RT1 to RT5 or RI1, RI2, RI3 (see spring 14 in FIG. 3) are as follows:

| | |
|---|---|
| Internal diameter, armature 13: | 55 mm |
| Internal diameter, spring 14: | 63 mm |
| External diameter, spring 14: | 109 mm |
| External diameter, armature 12: | 114 mm |

The axial dimensions of the joints respectively incorporating the springs RT1, RT3, RT4 and RI1 are as follows:

| | |
|---|---|
| Internal height, armature 13: | 115 mm |
| Internal height, spring 14: | 100 mm |
| External height, spring 14: | 75 mm |
| External height, armature 12: | 92 mm. |

The axial dimensions of the joints respectively incorporating the springs RT2, RT5, and RI2, RI3 are as follows (reduced by half relative to those above):

| | |
|---|---|
| Internal height, armature 13: | 57.5 mm |
| Internal height, spring 14: | 50 mm |
| External height, spring 14: | 38.5 mm |
| External height, armature 12: | 46 mm. |

Mechanical properties of the above-mentioned "control" springs and springs according to the invention The table below lists the main results obtained for each of these joints incorporating the elastomeric springs RT1 to RT5 and RI1 to RI3, relating to:
- the static creep measured in said "nominal" test configuration and in said "predeformed" test configuration (see paragraph I/ above);
- the dynamic creep measured in said "predeformed" test configuration (see paragraph II above);
- the endurance (number of cycles defined in paragraph III/ above);
- the static thermoelasticity (see paragraph IV/ above); and
- the static and dynamic stiffnesses Ks and Kd (see paragraph V/ above).

| Spring used | Nominal static creep (%/decade) | Predeformed static creep (%/decade) | Predeformed dynamic creep (%/decade) | Endurance in torsion (K cycles) | Static Thermo-elasticity (attitude variation in %/10° C.) | Static stiffness Ks (at 15 Hz, in N/mm) | Dynamic stiffness Kd (at 150 Hz, in N/mm) |
|---|---|---|---|---|---|---|---|
| RT1 | 1.99 | 1.52 | 2.66 | 24000 | 2.42 | 4526 | 4870 |
| RT2 | 3.81 | 1.62 | 2.27 | 171000 | 1.44 | 4423 | 5739 |
| RT3 | 2.19 | 0.83 | 3.93 | 38000 | 2.24 | 3050 | 3692 |
| RT4 | 2.90 | 1.69 | 3.29 | 16400 | 2.50 | 4820 | 5050 |
| RT5 | 2.32 | 1.13 | 1.14 | Joint breakage | 2.30 | 4435 | 5164 |
| RI1 | 3.33 | 2.02 | 1.86 | 48000 | 2.29 | 5966 | 6779 |
| RI2 | 1.77 | 0.88 | 1.15 | 57000 | 1.59 | 4228 | 5220 |
| RI3 | 1.55 | 0.72 | 1.36 | 21500 | 2.47 | 4728 | 5180 |

This table shows that the elastomeric springs RI1, RI2 or RI3 included in the joints according to the invention, which comprise as filler a non-reinforcing carbon black or a coarse silica, a quantity of sulfur of between 0.7 and 1.2 phr and a mass ratio of sulfur to accelerators of between 0.15 and 2.70, exhibit both minimized dynamic creep between the armatures of said joints and satisfactory torsional endurance, unlike the "control" springs RT1 to RT5.

It will be noted that use of zinc 2-ethylhexanoate as cross-linking activator contributes to minimization of the dynamic creep of these elastomeric springs RI1, RI2 and RI3 according to the invention.

It will additionally be noted that the quantity of 45 phr of non-reinforcing carbon black which is used in the spring RI2 according to the invention imparts to the corresponding joint a satisfactory thermoelasticity, due to the minimized attitude variation exhibited by said joint as a function of the temperature gradients applied.

What is claimed is:

1. An elastomeric suspension spring usable for bearing the load of a motor vehicle and formed of a cross-linked rubber composition based on (phr=parts by weight per hundred parts of rubber):
   natural rubber in a quantity equal to or greater than 60 phr;
   a filler comprising in a mass fraction greater than 55%:
      a carbon black whose grade varies from 600 to 900, said composition comprising in that case a total quantity of filler of from 10 to 60 phr, and/or
      an inert white filler, said composition comprising in that case a total quantity of filler of from 10 to 30 phr; and,
   a sulfur cross-linking system comprising at least one cross-linking accelerator, said cross-linking system comprising 0.7 to 1.2 phr of sulfur and being such that the mass ratio of sulfur to cross-linking accelerator(s) varies from 0.15 to 0.50.

2. An elastomeric suspension spring according to claim 1, wherein said filler comprises in a mass fraction greater than 70% said carbon black whose grade varies from 600 to 900 or said inert white filler.

3. An elastomeric suspension spring according to claim 1, wherein said filler comprises a blend of said carbon black whose grade varies from 600 to 900 and said inert white filler.

4. An elastomeric suspension spring according to claim 1, wherein said filler consists of said carbon black whose grade varies from 600 to 9000 or said inert white filler.

5. An elastomeric suspension spring according to claim 1, wherein said filler comprises a majority proportion of said carbon black and is present in said composition in a total quantity of from 40 to 60 phr.

6. An elastomeric suspension spring according to claim 1, wherein said cross-linking system additionally comprises, as cross-linking activator, zinc 2-ethylhexanoate.

7. An elastomeric suspension spring according to claim 1, wherein said composition comprises:
   natural rubber in a quantity of from 70 phr to 100 phr, and
   synthetic polyisoprene in a quantity of from 30 phr to 0 phr.

8. An elastomeric suspension spring according to claim 1, wherein said composition comprises natural rubber in a quantity of 100 phr.

9. An elastomeric suspension spring according to claim 1, wherein said cross-linked composition has a dynamic shear modulus G* at 100% deformation, measured to standard ASTM D 5992-96 at a temperature of 23° C. and a frequency of 10 Hz to standard ASTM D 1349-99, which is within a range from 0.5 MPa to 5.5 MPa.

10. A suspension joint for a motor vehicle, said joint being intended to bear the load of said vehicle and comprising:
   two substantially cylindrical and concentric armatures;
   an elastomeric suspension spring disposed between and connecting said armatures, wherein said spring is formed of a cross-linked rubber composition being based on (phr=parts by weight per hundred parts of rubber);
   natural rubber in a quantity equal to or greater than 60 phr;

a filler comprising in a mass fraction greater than 55%:
  a carbon black whose grade varies from 600 to 900, said composition comprising in that case a total quantity of filler of from 10 to 60 phr, or
  an inert white filler, said composition comprising in that case a total quantity of filler of from 10 to 30 phr; and a sulfur cross-linking system, comprising at least one cross-linking accelerator, said cross-linking system comprising 0.7 to 1.2 phr of sulfur and being such that the mass ratio of sulfur to cross-linking accelerator(s) varies from 0.15 to 0.50.

* * * * *

UNITED STATES PATENT AND TRADEMARK OFFICE
CERTIFICATE OF CORRECTION

| | |
|---|---|
| PATENT NO. | : 7,175,167 B2 |
| APPLICATION NO. | : 10/717390 |
| DATED | : February 13, 2007 |
| INVENTOR(S) | : Patrick Pennequin et al. |

It is certified that error appears in the above-identified patent and that said Letters Patent is hereby corrected as shown below:

TITLE Page - Insert

-- RELATED U.S. Application Data

(63) Continuation of PCT/EP02/05546, filed on May 21, 2002

(30) FOREIGN Application Priority Data

May 22, 2001 (FR) 01/06759 --

Signed and Sealed this

Twenty-sixth Day of February, 2008

JON W. DUDAS
*Director of the United States Patent and Trademark Office*